(12) United States Patent
Sari

(10) Patent No.: US 7,219,786 B1
(45) Date of Patent: May 22, 2007

(54) OPERATOR POSITION ADJUSTABLE PRODUCTION LINE MACHINE

(76) Inventor: Eric Sari, P.O. Box 317, Chattaroy, WA (US) 99003

( * ) Notice: Subject to any disclaimer, the term of this patent is extended or adjusted under 35 U.S.C. 154(b) by 478 days.

(21) Appl. No.: 10/368,983

(22) Filed: Feb. 18, 2003

(51) Int. Cl.
*B23P 21/00* (2006.01)
*B65G 15/00* (2006.01)

(52) U.S. Cl. .................................. 198/346; 29/791
(58) Field of Classification Search ............... 198/346; 29/791, 793, 794
See application file for complete search history.

(56) References Cited

U.S. PATENT DOCUMENTS

| | | | |
|---|---|---|---|
| 3,355,213 A | 11/1967 | Seddon | |
| 3,878,936 A | 4/1975 | Niggemyer | |
| 4,703,558 A * | 11/1987 | Makinen | 29/784 |
| 4,754,863 A | 7/1988 | Tsuchiya et al. | |
| 4,982,728 A | 1/1991 | Masuda et al. | |
| D326,861 S | 6/1992 | D'Amato | |
| 5,161,678 A | 11/1992 | Garvey | |
| 5,197,590 A * | 3/1993 | Prim et al. | 198/300 |
| 5,366,059 A * | 11/1994 | Demong | 198/303 |
| 5,539,975 A * | 7/1996 | Kukuljan et al. | 29/701 |
| 6,179,547 B1 * | 1/2001 | Hayakawa | 414/788.4 |
| 6,193,048 B1 * | 2/2001 | Keith | 198/346.1 |
| 6,208,505 B1 * | 3/2001 | Kuchta et al. | 361/683 |
| 6,431,346 B1 * | 8/2002 | Gilmore et al. | 198/588 |
| 6,481,563 B1 * | 11/2002 | Gilmore | 198/511 |
| 6,655,893 B2 * | 12/2003 | Kelly et al. | 414/393 |
| 6,659,263 B2 * | 12/2003 | Hendrickson et al. | 198/347.3 |
| 6,683,262 B2 * | 1/2004 | Scott | 177/145 |
| 6,929,114 B1 * | 8/2005 | Smeathers et al. | 198/833 |
| 2002/0092157 A1 | 7/2002 | Yoshida et al. | |
| 2002/0092728 A1 * | 7/2002 | Tanaka | 198/301 |
| 2003/0086240 A1 * | 5/2003 | Jobs et al. | 361/683 |

* cited by examiner

Primary Examiner—Mark A. Deuble

(57) ABSTRACT

An operator position adjustable production line assembly includes a main unit having a product path and an interior including a product cavity. An operable top is attached to the main unit with a plurality of support posts enabling equal or near equal access to the interior and product cavity from either side and the ends of the main unit. Optional side covers are selectively movable to increase product cavity and interior height of the main unit. A pair of control stations are provided, one on each side of the main unit, to enable operation from either side or both sides. An optional view screen is rotatably attached to the main unit to permit viewing from either of the control stations.

17 Claims, 6 Drawing Sheets

OPERATOR POSITION ADJUSTABLE PRODUCTION LINE MACHINE

BACKGROUND OF THE INVENTION

1. Field of the Invention

The present invention relates to production line machines and more particularly pertains to a new operator position adjustable production line machine for permitting a single machine to be adjusted such that the production line moves in a selectable direction relative to the operator of the machine.

2. Description of the Prior Art

The use of production line machines is known in the prior art. Typically, production line machines are constructed with a set operator station on one side of the machine. In many machines the direction of the production line is not adjustable either due to expense of a reversible conveyor or product path or multiple processes or actions may take place in a single machine and those processes or actions must occur in a particular order. Additionally, the structure of the machine may prevent access for maintenance from either side of the machine. These things prevent the machine from being placed in certain positions or force an operator to work from a set position. Forcing a worker to be in a set position may be particularly problematic for production lines requiring direct operator interaction with the product as it moves along the line because the direction of movement can tend to favor right-handed or left-handed operation. The following are exemplary of set operator stations and limited access line machines; U.S. Pat. No. 5,161,678 issued to Garvey, U.S. Pat. No. 3,878,936 issued to Niggemyer, U.S. Pat. No. 4,982,728 issued to Masuda et al., U.S. Patent Application No. 2002/0092157 filed by Yoshida et al., U.S. Pat. No. Des. 326,861 issued to D'Amato, U.S. Pat. No. 4,754,863 issued to Tsuchiya et al., U.S. Pat. No. 5,151,796 issued to Pierson, and U.S. Pat. No. 3,355,213 issued to Seddon.

While these devices fulfill their respective, particular objectives and requirements, the need remains for a device that is adjustable to permit positioning of an operator on a selectable side of the machine either to permit positioning of the machine in a particular work space or to permit moving the operator station to accommodate the preferences or physical characteristics of the various operators of the machine.

SUMMARY OF THE INVENTION

The present invention meets the needs presented above by providing operational controls on either side of the machine including when necessary a viewing screen that can be turned to face either side of the machine, alternate sets of controls on each side of the machine, and an appropriate switching mechanism to permit selection of which of the alternate sets of controls will be operational.

Another object of the present invention is to provide a new operator position adjustable production line machine that provides access to the interior of the machine as needed from either side of the machine.

Still another object of the present invention is to provide a new operator position adjustable production line machine that economically provides versatility to insure the machine will be integratable into an existing production line that may already be positioned such that an operator cannot be positioned on one side of the machine.

To this end, the present invention generally comprises a main unit having a conveyor or product path cavity. A pair of control stations are provided, one on each side of the main unit. A switching mechanism is included to permit selection of which control station is activated to control the main unit. As needed, a view screen is rotatably attached to the main unit such that it may be turned to face either control station. In covered embodiments, the main unit includes a top and optional side covers that lift vertically, separately or together, to provide an adjustable height to the product path cavity or to provide access to the interior of the main unit.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
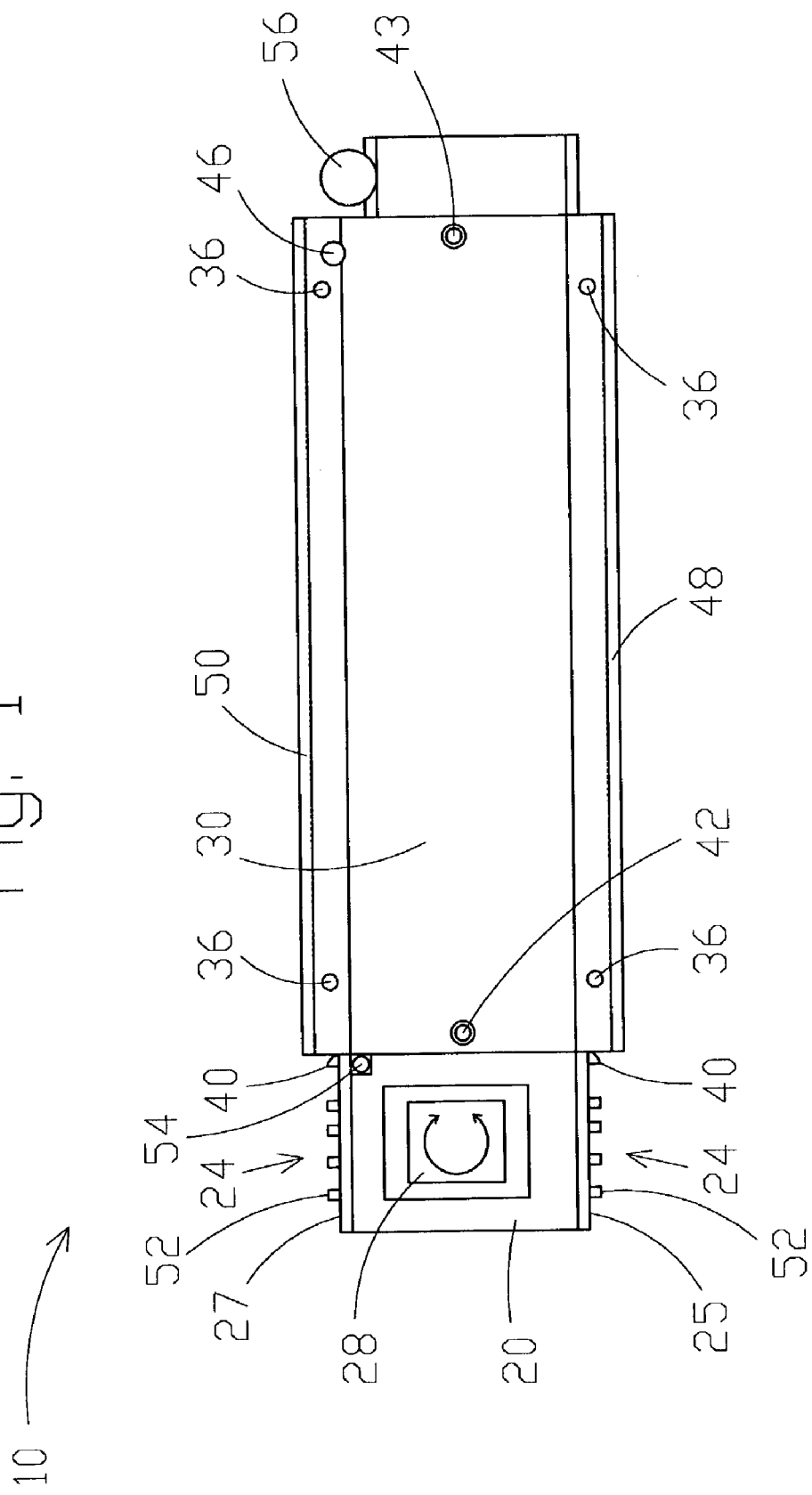
FIG. 1 is a top view of a new operator position adjustable production line machine according to the present invention.
Figure 2:
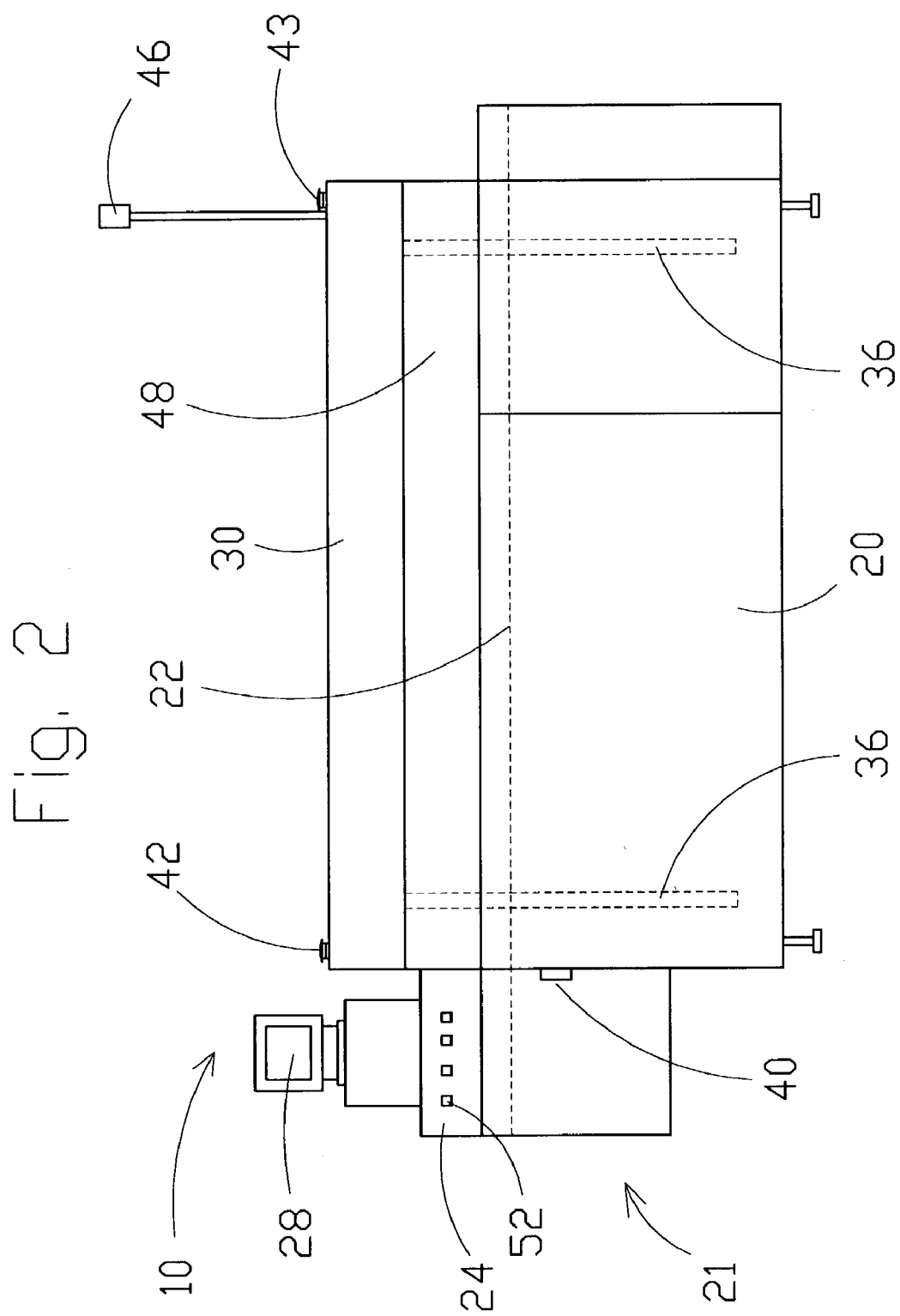
FIG. 2 is a side view of the present invention with the top in a closed position.

With reference now to the drawings, and in particular to FIGS. 1 through 6 thereof, a new operator position adjustable production line machine embodying the principles and concepts of the present invention and generally designated by the reference numeral 10 will be described. The particular machine shown relates to surface mount assembly of circuit boards but the principles of the invention may be applied to all production line machines in which a product is conveyed or passed from one end to another.

As best illustrated in FIGS. 1 through 6, the operator position adjustable production line machine 10 generally comprises a main unit 20 that includes a product cavity 34 and a product path 22. Typically, to reduce expense, the product moves in a single direction from one end of the main unit 20 to the other end. A pair of control stations 24 is provided. Each control station 24 is positioned on a respective side 25,27 of the main unit 20. The control stations may be redundant, i.e. duplicates of each other, and both active simultaneously or a switching assembly 26 may be operationally coupled to the pair of control stations 24 for selective activation of either one of the control stations 24. Thus, an operator of the main unit can be positioned on either side of the main unit such that the product moves either left to right or right to left relative to the operator.

In an embodiment, a view screen 28 is rotatably coupled to a top surface of the main unit 20 such that the view screen 28 is viewable by an operator positioned at either one of the pair of control stations 24 by turning the view screen 28 to the desirable position. The view screen is operational throughout the full turning radius to be viewable throughout the full range of motion of the view screen. Thus, the view screen may be positioned at a desired angle during use.

In an embodiment, the main unit 20 includes a top 30 and optional side covers 32. A plurality of support posts 36 is selectively coupled between the main unit 20, the top 30 and the optional side covers 32. The support posts may be directly connected to either the top or the side covers as desired. The support posts 36 are extendable from the main unit 20 to raise or lower the top 30 and/or optional side covers 32 to increase or decrease the height of product cavity 34 and/or provide access to the interior of the main unit 20. This may be achieved through known mechanical techniques such as telescopic support posts operated by lead screws, air cylinders, or hydraulic cylinders. Post operating means 40 such as a control button or switch are provided for extending the support posts 36 to raise or lower top 30 and/or optional side covers 32. The post operating means 40 is mirrored to be part of each control station 24 and is operationally controlled from an activated one of the pair of control stations 24.

Top 30 extends between the opposite sides of the main unit 20 to provide access to the process cavity 34 or the interior of the main unit 20. It is contemplated that the structure of the main unit is substantially symmetrical to provide equal access to the process cavity 34 or the interior from either side of the main unit 20.

A stop button 42 or equivalent control is operationally coupled to the main unit 20 for permitting selective shut down of the main unit 20 in an emergency situation. The stop button 42 is positioned between the control stations 24 such that the stop button 42 is designed to be accessible to an operator at either one of the control stations 24. This positioning separates the stop button from other controls in the control stations to prevent accidental use of the stop button while still permitting access to an operator at either control station 24. Preferably, the stop button 42 is positioned along a longitudinal axis of the main unit 20 so that the stop button is substantially equidistant from each control station 24.

In an embodiment, the stop button 42 is positioned proximate end 21 of the main unit 20. A second stop button 43 is positioned proximate end 23 of the main unit 20 opposite end 21. The second stop button 43 is similarly operationally coupled to permit emergency shut down of the main unit and is similarly positioned equidistant between the opposite sides of the main unit to permit equal access from either side of the main unit. If the main unit is very wide, stop buttons 42 and 43 may become pairs of stop buttons offset to sides 25 and 27 to be readily reachable from either side of the main unit.

As may be needed, a light tower 46 is coupled to the main unit 20. Further, an air filter 48 may be coupled to the main unit 20. The unit shown is representative of one used for electronic circuit board construction and is an example of a unit having heating and then cooling as the product moves along the conveyor. In this unit the air filter 48 extends along one of the sides 25,27 of the main unit 20. A second air filter 50 may be provided to extend along an associated side 25,27 of the main unit 20 opposite the first air filter 48. Air filters 48 and 50 may or may not be equal in length and may or may not be equal to top 30 length.

Figure 3:
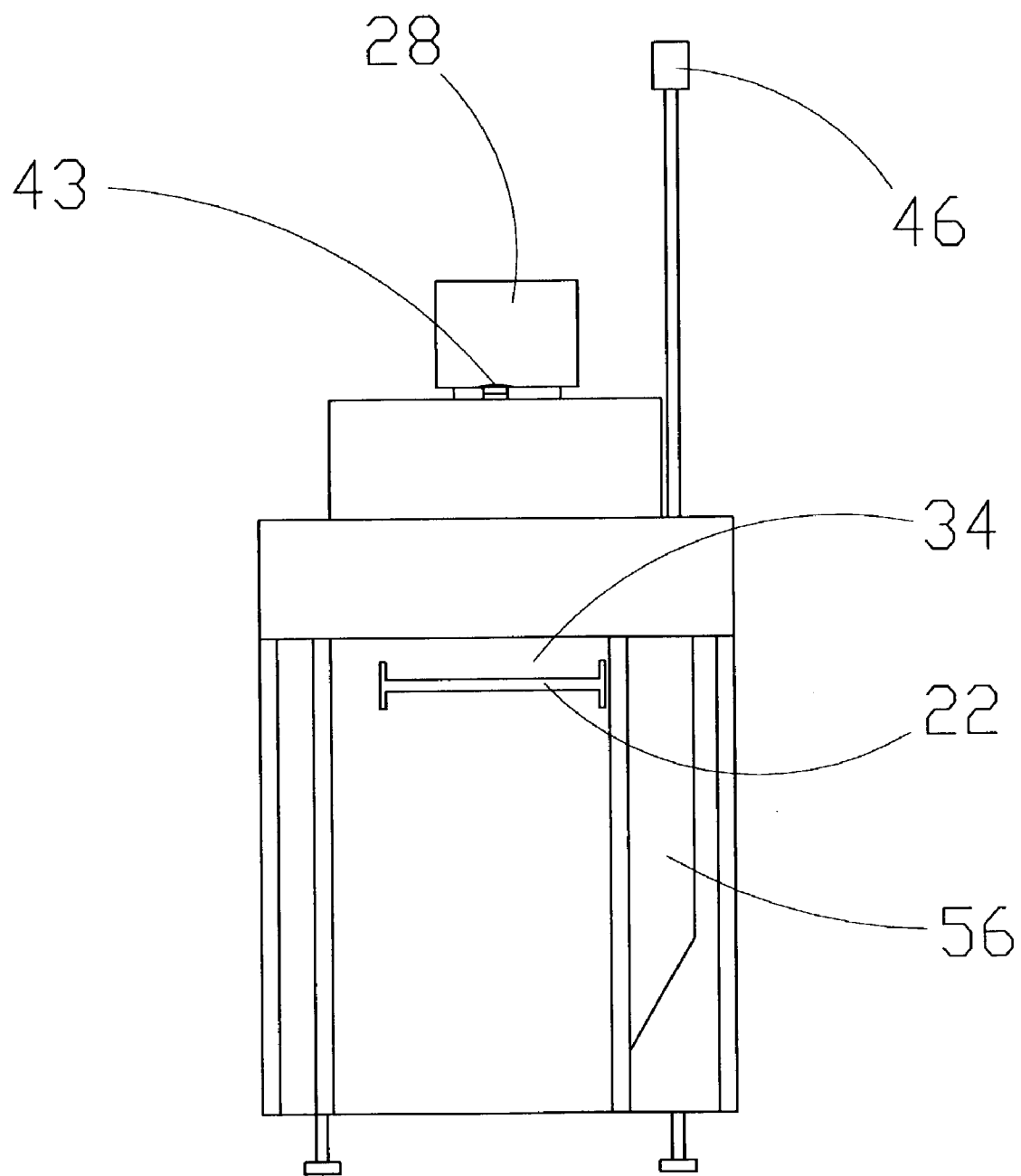
FIG. 3 is an end view of the present invention.
Figure 4:
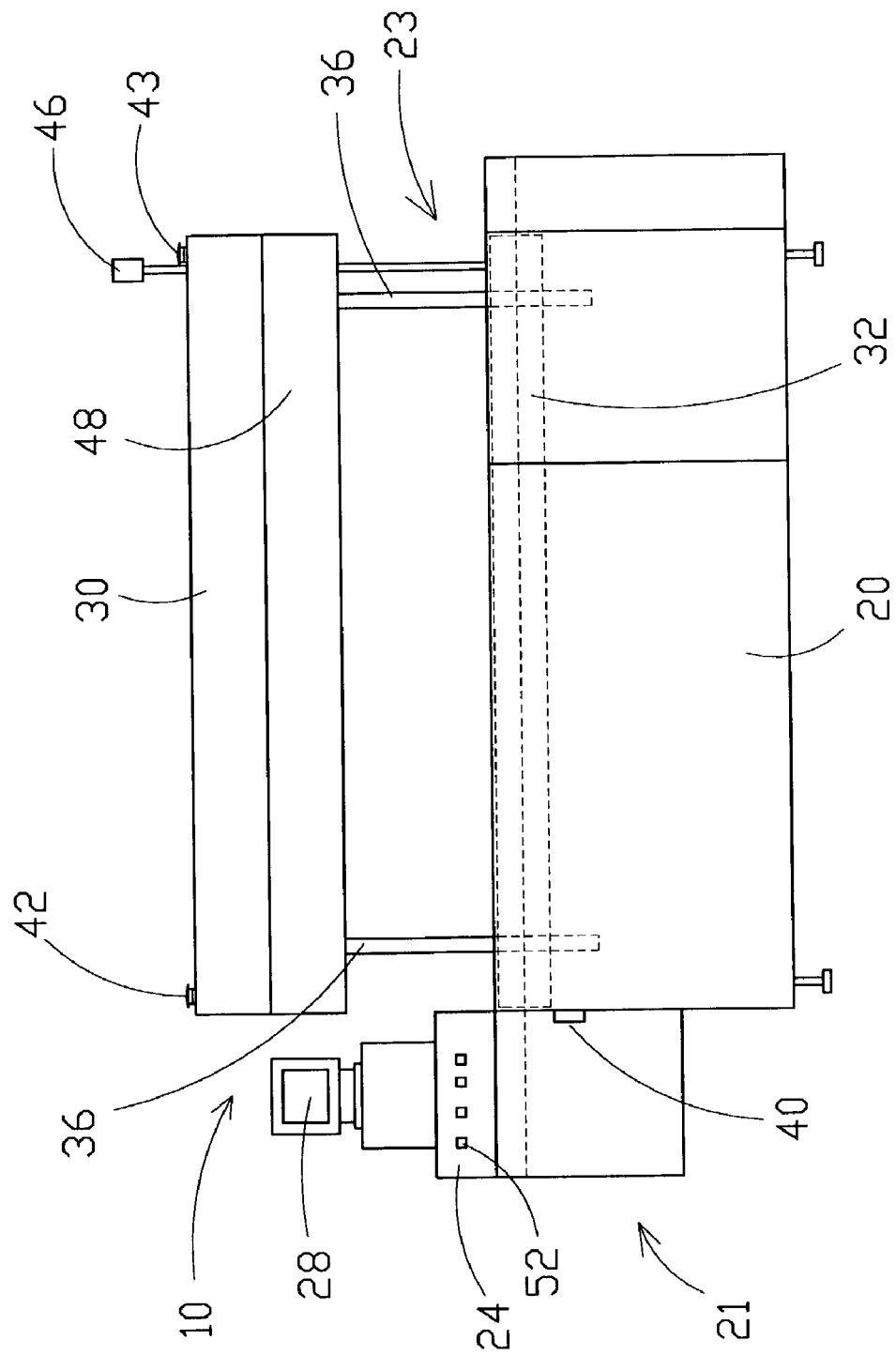
FIG. 4 is a side view of the present invention with the top in an open position.
Figure 5:
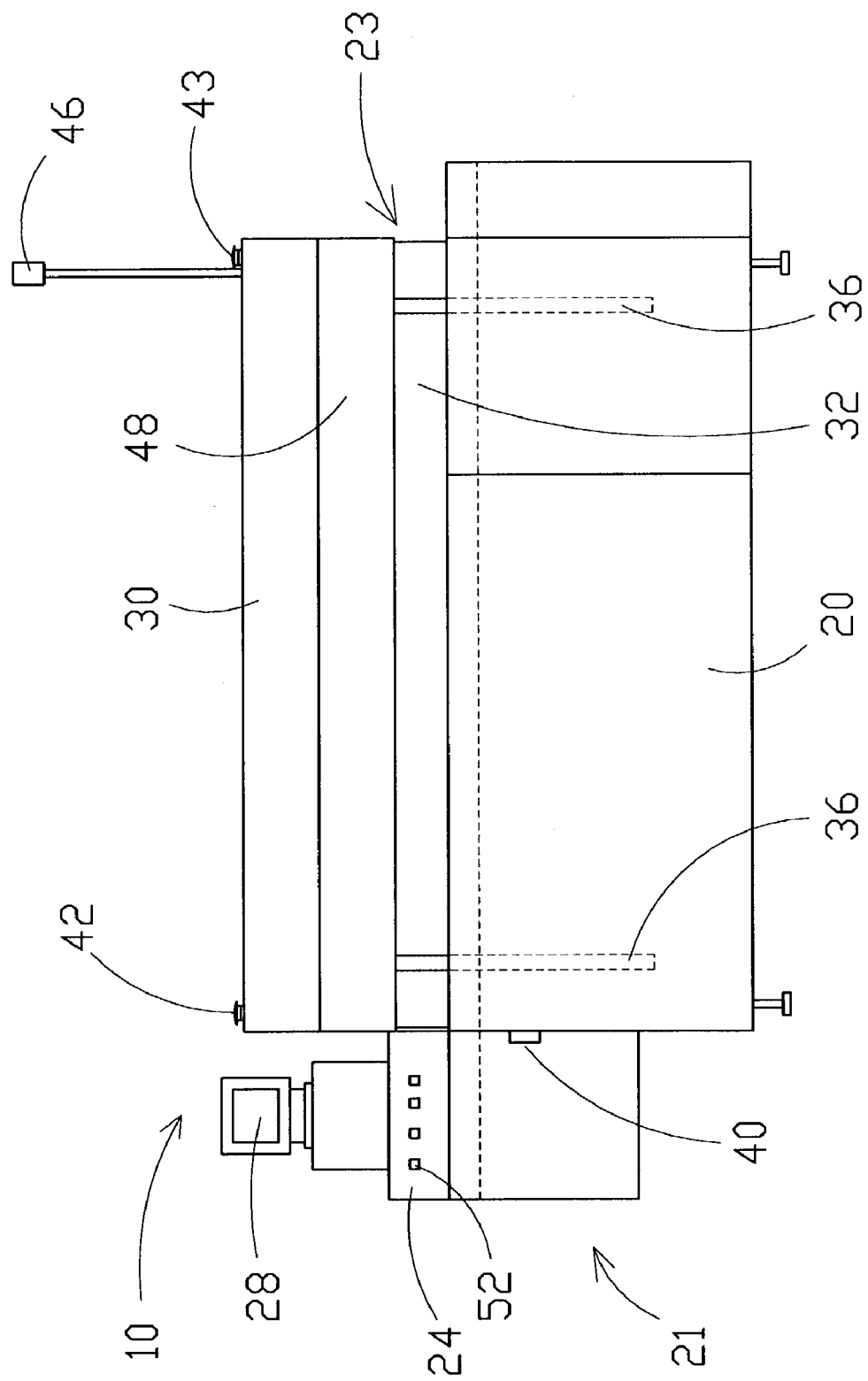
FIG. 5 is a side view of the present invention with the product path cavity increased in height.
Figure 6:
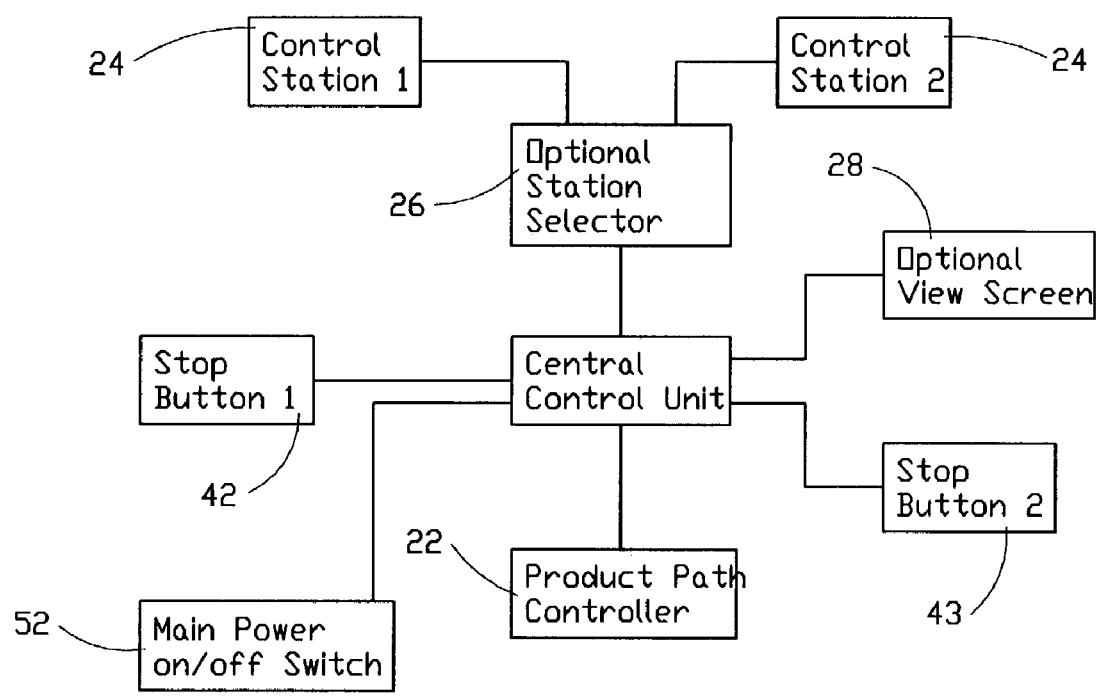
FIG. 6 is a schematic diagram view of the present invention.

The main power on/off switch or circuit breaker is operated by the main power handle 52 which pivots equidistant between opposite sides 25,27 of the main unit 20 enabling power to be turned on and off from either side of the main unit at any time. Main power receptacle 54 is usually located as shown in FIG. 1 on side 27 but may be alternately located on side 25. Exhaust opening 56 is usually located as shown in FIG. 1 and FIG. 3 on side 27 but may be alternately located on side 25.

In use, production lines may only permit access to a single side of each machine. The present invention may be installed into a new or existing line of machines such that the product path and process direction is consistent with the production line and the operator will have access to the process cavity and the control station. The present invention may be installed into process lines running left to right or right to left with access from only one side or the other or both sides. In any event the operator will be able to operate the invention from the preferred side or equally from both sides and have access to the process cavity from the preferred side or equally from both sides.

It is contemplated that the features described above may be employed in various combinations. The above described embodiments are not intended to limit the invention to specific combinations of described features and it is intended that the above description incorporates all combinations and permutations of the described features except where those features may be mutually exclusive.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An operator position adjustable production line assembly comprising:
   a main unit having a pair of sides, a product path, and a product process cavity; and
   a pair of redundant control stations, each control station being positioned on a respective side of said main unit such that said main unit is operable by an operator positioned adjacent to a selectable side of said main unit;
   an air filter coupled to said main unit, said air filter extending along one of said sides of said main unit.

2. The operator position adjustable production line assembly of claim 1, further comprising:
   said main unit having a top being movable vertically to provide access to an interior of said main unit, said interior including said product cavity.

3. The operator position adjustable production line assembly of claim 2, further comprising:
   a plurality of support posts coupled between said main unit and said top, said support posts being extendable from said main unit to support said top in an elevated position over said main unit.

4. The operator position adjustable production line assembly of claim 3, further comprising:

a post operating assembly for extending said posts to move said top, said post operating assembly being operationally controlled to each said control station.

5. The operator position adjustable production line assembly of claim 2, further comprising:

side covers coupled to said top for forming sides of said product process cavity.

6. The operator position adjustable production line assembly of claim 1, further comprising:

a stop button operationally coupled to said main unit for permitting selective shut down of said main unit, said stop button being positioned between said control stations such that said stop button is adapted for being accessible to an operator positioned at a selectable one of said control stations.

7. The operator position adjustable production line assembly of claim 6 wherein said stop button is positioned along a longitudinal axis of said main unit.

8. The operator position adjustable production line assembly of claim 6, further comprising:

said stop button being a first stop button, said first stop button being positioned proximate an first end of said main unit; and a second stop button, said second stop button being positioned proximate a second end of said main unit opposite said first end.

9. The operator position adjustable production line assembly of claim 1, further comprising:

a light tower coupled to said main unit.

10. The operator position adjustable production line assembly of claim 1, further comprising:

said main unit having a top for covering an opening into said main unit, said opening extending between a pair of sides of said main unit to provide access to said interior of said main unit; and side covers coupled to said top for adjusting a height of said top above said opening.

11. The operator position adjustable production line assembly of claim 1, further comprising:

said air filter being a first air filter;

a second air filter extending along an associated side of said main unit opposite said first air filter.

12. The operator position adjustable production line assembly of claim 1, further comprising:

a main power handle operationally coupled to said main unit and positioned for being operable from each said side of said main unit.

13. The operator position adjustable production line assembly of claim 1, further comprising:

an exhaust opening in said main unit, said exhaust opening being positioned closer to one of said pair of sides of said main unit.

14. The operator position adjustable production line assembly of claim 1, further comprising;

two stop buttons offset from a longitudinal axis of said main unit such that each stop button is reachable from a respective one of said sides of said main unit.

15. The operator position adjustable production line assembly of claim 1, further comprising:

a switching assembly operationally coupled to said pair of control stations for selective activation of each control station.

16. The operator position adjustable production line assembly of claim 1, further comprising:

a pair of first end stop buttons, each first end stop button being positioned at a first end of said main unit proximate a respective side of said main unit; and a pair of second end stop buttons, each second end stop button being positioned at a second end of said main unit proximate a respective side of said main unit.

17. The operator position adjustable production line assembly of claim 1, further comprising:

a main power receptacle, said main power receptacle being positioned closer to one of said sides of said main unit.

* * * * *